United States Patent [19]
Gozdz et al.

[11] Patent Number: 5,418,091
[45] Date of Patent: May 23, 1995

[54] POLYMERIC ELECTROLYTIC CELL SEPARATOR MEMBRANE

[75] Inventors: Antoni S. Gozdz, Tinton Falls; Caroline N. Schmutz, Eatontown; Jean-Marie Tarascon, Martinsville; Paul C. Warren, Far Hills, all of N.J.

[73] Assignee: Bell Communications Research, Inc., Livingston, N.J.

[21] Appl. No.: 110,262

[22] Filed: Aug. 23, 1993

Related U.S. Application Data

[63] Continuation-in-part of Ser. No. 26,904, Mar. 5, 1993, Pat. No. 5,296,318.

[51] Int. Cl.6 ............................................. H01M 2/16
[52] U.S. Cl. ..................................... 429/252; 429/254
[58] Field of Search ............... 429/192, 194, 191, 252, 429/254, 251; 264/344

[56] References Cited

U.S. PATENT DOCUMENTS 4,468,441  8/1984  D'Agostino ..................... 429/254 X

OTHER PUBLICATIONS

Feuillade, G, "Ion-Conductive Macromolecular Gels and Membranes . . .," *J. Appl. Electrochem.*, 5 (May, 1975), pp. 63–69.

*Primary Examiner*—John S. Maples
*Attorney, Agent, or Firm*—Leonard Charles Suchyta; Lionel N. White

[57] ABSTRACT

A flexible polymeric film useful as an interelectrode separator or electrolyte member in electrolytic devices, such as rechargeable batteries, comprises a copolymer of vinylidene fluoride with 8 to 25% hexafluoropropylene. The film may be cast or formed as a self-supporting layer retaining about 20% to 70% of a high-boiling solvent or solvent mixture comprising such solvents as ethylene carbonate, propylene carbonate, dimethyl carbonate, and dibutyl phthalate. The film may be used in such form or after leaching of the retained solvent with a film-inert low-boiling solvent to provide a separator member into which a solution of electrolytic salt is subsequently imbibed to displace retained solvent or replace solvent previously leached from the polymeric matrix.

11 Claims, 4 Drawing Sheets

POLYMERIC ELECTROLYTIC CELL SEPARATOR MEMBRANE

RELATED APPLICATION

This application is a continuation-in-part of U.S. patent application Ser. No. 08/026,904, filed 5 Mar. 1993, now U.S. Pat. No. 5,296,318, issued 22 Mar. 1994, which is assigned to the assignee of this application.

BACKGROUND OF THE INVENTION

The present invention relates to polymeric film compositions useful in preparing separator membranes for electrolytic cells. For example, such a film material may be used in a rechargeable battery cell as an intermediate separator element containing an electrolyte solution through which ions from a source electrode material move between cell electrodes during the charge/discharge cycles of the cell. The invention is particularly useful for such cells in which the ion source is lithium, a lithium compound, or a material capable of intercalating lithium ions. There, the separator membrane comprises a polymeric matrix which is ionically conductive by virtue of, for example, the incorporation of an organic solution of a dissociable lithium salt which provides ionic mobility.

Early rechargeable lithium cells utilized lithium metal electrodes as the ion source in conjunction with positive electrodes comprising compounds capable of intercalating the lithium ions within their structure during discharge of the cell. Such cells relied, for the most part, on separator structures or membranes which physically contained a measure of fluid electrolyte, usually in the form of a solution of a lithium compound, and which also provided a means for preventing destructive contact between the electrodes of the cell. Sheets or membranes ranging from glass fiber filter paper or cloth to microporous polyolefin film or nonwoven fabric have been saturated with solutions of a lithium compound, such as $LiClO_4$, $LiPF_6$, or $LiBF_4$, in an organic solvent, e.g., propylene carbonate, diethoxyethane, or dimethyl carbonate, to form such electrolyte/separator elements. The fluid electrolyte bridge thus established between the electrodes has effectively provided the necessary $Li^+$ ion mobility at conductivities in the range of about $10^{-3}$ S/cm.

Although serving well in this role of ion conductor, these separator elements unfortunately comprise sufficiently large solution-containing voids that continuous avenues may be established between the electrodes, thereby enabling lithium dendrite formation during charging cycles which eventually leads to internal cell short-circuiting. Some success has been achieved in combatting this problem through the use of lithium-ion cells in which both electrodes comprise intercalation materials, such as lithiated manganese oxide and carbon (U.S. Pat. No. 5,196,279), thereby eliminating the lithium metal which promotes the deleterious dendrite growth. Although providing efficient power sources, these lithium-ion cells do not readily attain the capacity provided by lithium metal electrodes.

Another approach to controlling the dendrite problem has been the use of continuous films or bodies of polymeric materials which provide little or no continuous free path of low viscosity fluid in which the lithium dendrite may propagate. These materials may comprise polymers, e.g., poly(alkene oxide), which are enhanced in ionic conductivity by the incorporation of a salt, typically a lithium salt such as $LiClO_4$, $LiPF_6$, or the like. A range of practical ionic conductivity, i.e., over about $10^{-5}$ to $10^{-3}$ S/cm, was only attainable with these polymer compositions at ambient conditions well above room temperature, however. Some improvement in the conductivity of the more popular poly(ethylene oxide) compositions has been reported to have been achieved by radiation-induced cross-linking (U.S. Pat. No. 5,009,970) or by meticulous blending with exotic ion-solvating polymer compositions (U.S. Pat. No. 5,041,346). Each of these attempts achieved limited success due to attendant expense and restricted implementation in commercial practice.

Some earlier examinations of poly(vinylidene fluoride) polymers and related fluorocarbon copolymers with trifluoroethylene or tetrafluoroethylene revealed enhancement of ionic conductivity by a simpler incorporation of lithium salts and organic solvents which are compatible with both the polymer and salt components. This work by Tsuchida et al. (*Electrochimica Acta*, Vol. 28 (1983), No. 5, pp. 591–595 and No. 6, pp. 833–837) indicated, however, that the preferred poly(vinylidene fluoride) compositions were capable of exhibiting ionic conductivity above about $10^{-5}$ S/cm only at elevated temperatures, reportedly due to the inability of the composition to remain homogeneous, i.e., free of deleterious salt and polymer crystallites, at or below room temperature. Such limitations apparently led to the abandonment of attempts to implement these compositions in practical applications, such as rechargeable battery cells.

The present invention provides a means for avoiding the disadvantages of prior electrolytic cell compositions and constructions by enabling the ready and economical preparation of strong, flexible polymeric electrolytic cell membranes which will readily retain electrolyte salt solutions and remain functional over a range extending well below room temperature.

SUMMARY OF THE INVENTION

Polymeric electrolytic cell separator elements utilizing the membrane materials of the present invention comprise the combination of a poly(vinylidene fluoride) copolymer matrix, an electrolyte salt, and a compatible high-boiling solvent which maintains a homogeneous composition in tile form of a flexible, self-supporting film. The copolymer comprises about 75 to 92% by weight vinylidene fluoride and 8 to 25% hexafluoropropylene, a range in which the latter co-monomer limits the crystallinity of the final copolymer to a degree which ensures good film strength while enabling the retention of about 40 to 60% of a solvent for the electrolyte salt. Within this range of solvent content, the 5 to 7.5% salt comprising a hybrid electrolyte membrane promotes an effective ionic conductivity of between about $10^{-5}$ and $10^{-3}$ S/cm, yet the membrane exhibits no evidence of solvent exudation which might lead to cell leakage or loss of conductivity.

Electrolytic cells, such as rechargeable battery cells, may be constructed by means of in situ preparation of the electrode and electrolyte elements, utilizing coatable compositions comprising the copolymer materials of the present invention. For example, in the construction of a lithium battery, a terminal layer of aluminum foil or grid may be coated with a dispersion of intercalation electrode composition, e.g., a $LiMn_2O_4$ powder in a polymer matrix solution, which is dried to form the positive electrode. Any one of the present copolymers serves particularly well for this purpose, since matrix compatibility is ensured. A hybrid electrolyte separator layer is then formed on the positive electrode from a coating of a composition comprising a solution of the copolymer and a lithium electrolyte salt. A lithium foil electrode and a copper terminal foil or grid are in turn pressed onto the assembly to complete the cell structure. In a lithium-ion cell, a copper foil coated with carbon, e.g., petroleum coke or graphite, dispersed in a composition of the electrolyte copolymer is substituted for the lithium metal and terminal foils. Although this process lends itself desirably to continuous production of battery cells, the hygroscopic property of preferred lithium electrolyte salts imposes extreme limitations on the conditions under which the coating and cell assembly operations are carried out.

A preferred alternative procedure for constructing such a battery comprises the separate formation of the electrode elements, by coating or otherwise, followed by assembly of the resulting electrodes with an intermediate separator membrane prepared according to the present invention. At this assembly stage, the separator membrane is substantially devoid of the hygroscopic electrolyte salt. Only during the final battery sealing operation when the electrolyte salt solution is introduced into the battery cell is there concern for maintaining anhydrous conditions, as may be effectively achieved in an atmosphere of dry, inert gas. Once in contact with the assembled separator body, the salt solution readily migrates throughout the membrane matrix to provide substantially the same conductivity enhancement as achieved by a preformed hybrid electrolyte film.

The present separator/electrolyte film membrane is generally prepared from a composition comprising the vinylidene fluoride (VdF):hexafluoropropylene (HFP) copolymer and a high-boiling solvent, or plasticizer. This plasticizing solvent may be any of the various organic compounds commonly used as solvents for the electrolyte salts, e.g., propylene carbonate, diethoxyethane, dimethyl carbonate, ethylene carbonate, and the like, as well as mixtures of these compounds. A particularly suitable group of such solvents are binary or tertiary mixtures of ethylene carbonate, propylene carbonate, and dimethyl carbonate. Higher-boiling plasticizer compounds, such as dibutyl phthalate, may also be used. The addition of inorganic fillers, such as alumina or silanized fumed silica, enhances the physical strength of a membrane and, in some compositions, increases the subsequent level of electrolyte absorption.

Any common procedure for casting or forming films of polymer compositions may be employed in the preparation of the present membrane material. Where casting or coating of a fluid composition is used, e.g., by spin-coating or with meter bar or doctor blade apparatus, the viscosity of the composition will normally be reduced by the addition of a low-boiling casting solvent, such as tetrahydrofuran (THF), acetone, or the like. Such coatings may be air-dried at moderate temperature to yield self-supporting films of homogeneous, plasticized copolymer. The membrane material may also be formed by allowing the copolymer in commercial form, i.e., bead or powder, to swell in a proportionate amount of plasticizer solvent and then pressing the swollen mass between heated (e.g., about 130° C.) plates or rollers, or extruding the mixture.

The plasticized film material may be used in that form to fashion cell separator membranes, or it may be reduced to a "dry" film by extraction, or leaching, of the plasticizer solvent from the copolymer matrix with a polymer-inert extracting solvent, such as diethyl ether. Either form of the film material may be stored until assembled into a final electrolytic cell. As an alternative, a cell may be assembled with plasticized membrane material prior to extraction with solvent to obtain a "dry" cell.

Upon introduction of electrolyte salt solution into an assembled cell, a plasticized film membrane will imbibe the solution throughout the matrix, in effect "displacing" plasticizer solvent. A "dry" membrane, on the other hand, will readily absorb the electrolyte solution to substantially regain the extracted plasticizer. An advantage realized with this latter form of separator membrane material arises from the fact that the loss of film volume experienced upon plasticizer extraction is recovered in the solution absorption and matrix swelling after the film has been assembled into the cell, thus creating a moderate pressure between the cell elements which ensures effective element surface contact.

A further advantage of the "dry" film embodiment of the invention over prior separator membrane materials is the lack of voids which were usually dispersed throughout a sheet or film, either naturally due to fiber interweaving or intentionally as a result of mechanical processing of some polyolefin film materials. Such voids not only lead to dangerous dendrite growth in cells such as rechargeable lithium batteries, but also prevent a natural absorption of electrolyte solution into assembled cell structures due to the air entrapped within the voids. This latter problem could previously only be alleviated by additional cell assembly operations requiring evacuation of the cell to remove air from the separator material and introduction of electrolyte under pressure prior to sealing the cell. A dry separator membrane of the present invention, i.e., one from which the initial plasticizer solvent has been leached, on the other hand, possesses no discernible voids, rather it appears to exhibit a solvent recovery "memory" which prompts the membrane to readily absorb an amount of electrolyte solution substantially equal to that of the initial plasticizer. In this manner, the desired ion conductivity range of up to about $10^{-3}$ S/cm is readily achieved.

BRIEF DESCRIPTION OF THE DRAWING

The present invention will be described with reference to the accompanying drawing of which.

DESCRIPTION OF THE INVENTION

Figure 1:
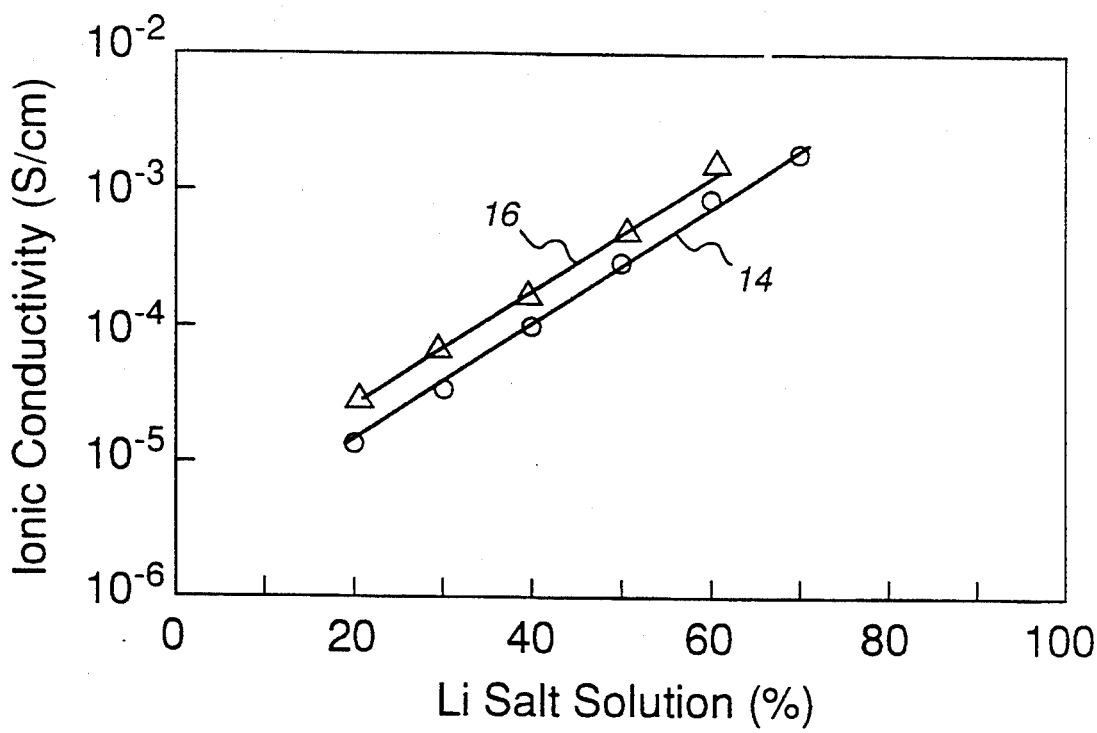
FIG. 1 is a graph tracing the ionic conductivity of embodiments of the present polymeric separator membrane as a function of the amount of retained lithium salt solution.

A number of commercially-available polyvinylidene fluoride (PVdF) polymers and copolymers were investigated for utilization in preparing the polymeric electrolyte/separator films of the invention. Since the ready formation of self-supporting films or layers of polymeric electrolyte is of paramount importance in practical electrolytic cell construction, attempts were initially made to cast these various polymer products as films from easily-managed solvent solutions at reasonable ambient conditions, i.e., from dissolution with no more than moderate heating to formation of a sturdy dry layer without excessive processing, such as extended radiation or annealing. Tetrahydrofuran was selected as a common casting solvent for the PVdF materials, as well as for the high-boiling solvents, or plasticizers, to be incorporated later, on the basis of its desirable solvating and drying properties. Other organic solvents, such as acetone, methyl ethyl ketone, and the like, were also suitable.

Samples of PVdF homopolymers (commercially available from Atochem North America under the trademark, Kynar) in the molecular weight ranges of about $155 \times 10^3$ and $535 \times 10^3$, respectively, were suspended at a wt. ratio of about 12.5% in a mixture of 75% tetrahydrofuran (THF) and 12.5% of an equipart mixture of the high-boiling solvents ethylene carbonate (EC) and propylene carbonate (PC) which is typically used in secondary lithium batteries as a dispersion vehicle for lithium salt electrolyte compositions. Although dissolution of these samples was ultimately achieved after heating at about 60° C., the solutions gelled to an unworkable state after standing for a short time at room temperature, rendering these materials unsuitable for practical electrolyte membrane use.

Despite this unsatisfactory showing, it was deemed prudent to reexamine the PVdF homopolymer under the conditions reported by Tsuchida et al. (earlier noted). The sample having the lower MW, i.e., in the range of the Tsuchida material, was dissolved in the described manner in a heated mixture of acetone and the EC/PC mixture which now contained $LiClO_4$ in 1M solution. The composite solution was cooled to room temperature and before the onset of solidification a portion was immediately spin cast onto a silicon disk and dried to a final thickness of about 0.1 mm. The resulting film exhibited a pronounced bloom or whitening indicative of tile inhomogeneity resulting from polymer and salt crystallite formation. The film also exhibited low physical strength and split under moderate handling. Although the crystallite-disrupted surface of the film sample presented a somewhat difficult contact for the subsequent conductivity testing, values were obtained which confirmed the best Tsuchida measurements, i.e., in the range approaching $10^{-5}$ S/cm. This level of conductivity is well below the range of practical utility and, considered with the undesirable working and physical properties of the intermediate solution and coated film, highlights the unsatisfactory quality of the PVdF homopolymers for use in polymeric separator membranes. This conclusion appears to be supported by the lack of reported successes with these materials during tile long time since the Tsuchida investigations.

The PVdF copolymers suggested by Tsuchida et al. as being less desirable than their preferred homopolymer were also examined. In particular, a sample of vinylidene fluoride—tetrafluoroethylene copolymer having about $245 \times 10^3$ MW was tested for solubility, coatability, and conductivity with a preferred $LiPF_6$ salt in the above-noted solvents. Although the conductivities of 40–60% high-boiling solvent ratio compositions registered within the desirable range of $10^{-5}$ to $10^{-3}$ S/cm, their films continued to exhibit the unsatisfactory crystallite separation and structural inadequacy.

In the present invention, however, a group of PVdF copolymers has been discovered which meets the requirements for successful electrolytic cell separator membrane material, particularly for use in lithium battery cells. The undesirably high crystallinity of tile PVdF homopolymer may apparently be suppressed to an optimum degree by the copolymerization of vinylidene fluoride with about 8 to 25% hexafluoropropylene (HFP). It was found that below this lower limit the crystallinity of the primary monomer persists with resulting unmanageable coating solutions, unsatisfactory film texture and strength, and limited high-boiling solvent retention. Beyond the higher limit, on the other hand, although the solutions remain fluid at ambient room temperature and below, removal of the major coating vehicle, e.g., tetrahydrofuran (THF), fails to result in the formation of a self-supporting film, unless additional processing such as cross-linking under actinic radiation is undertaken.

A number of electrolytic cell separator membrane compositions comprising VdF-HFP copolymers within the noted monomer ratio range were tested for conductivity and physical suitability for use in cells such as rechargeable batteries. The following examples of test electrolyte and cell compositions were prepared under anhydrous conditions, e.g., with anhydrous reagents and in a helium environment, due to the extreme moisture sensitivity of the lithium salts.

EXAMPLE 1

A polymeric electrolyte/separator film was prepared by casting a portion of the following coating composition onto a polished silicon wafer using a common spin-coating apparatus operated at 600 rpm for 2 sec. The film was allowed to dry at room temperature for about 10 min within the confines of the coating apparatus, in order to minimize uneven drying or flashing of the THF vehicle solvent, to yield a clear, tough, elastic film about 50 μm thick. The coating solution was prepared by suspending about 1.5 g of an 88:12 VdF:HFP copolymer of about $380 \times 10^3$ MW (Atochem Kynar FLEX 2801) in about 9 g of anhydrous THF and adding to this mixture about 1.5 g of a 1M solution of $LiPF_6$ in a 1:1 mixture by weight of ethylene carbonate (EC):propylene carbonate (PC). The completed mixture was warmed to about 60° C. for 30 min to facilitate dissolution and with occasional agitation a solution was obtained which retained its fluidity upon standing at room temperature for a number of hours.

The resulting film, comprising copolymer, EC/PC solvent, and $LiPF_6$ in a weight ratio of about 50:44.3:5.7, was readily removed from the coating substrate for conductivity testing according to the usual ac impedance method on common test equipment, e.g., a Hewlett-Packard computer-controlled HP4192A capacitance bridge operating over the frequency range of 5 Hz to 10

MHz. The film exhibited an ionic conductivity of about $4 \times 10^{-4}$ S/cm.

EXAMPLE 2

An electrolyte film coating composition was prepared according to Example 1 utilizing instead an 85:15 copolymer of VdF:HFP (Atochem Kynar FLEX 2750). Doctor blade coating at about 0.5 mm followed by ambient air drying produced an exceptionally clear, tough, elastic 0.1 mm film which provided a conductivity of about $3 \times 10^{-4}$ S/cm.

EXAMPLE 3

Indicative of other electrolyte film formation techniques which may be used with the present compositions, 55 and 50 parts by wt of the copolymers of Examples 1 and 2, respectively, were suspended, without THF vehicle solvent, in 45 and 50 parts of the EC/PC lithium salt electrolyte solution. The resulting swollen slurried masses were pressed at about 130° C. for 1 min between polished aluminum plates separated by 0.15 mm shims. After cooling to room temperature, the resulting clear, flexible films respectively exhibited conductivities similar to those obtained in the earlier examples.

EXAMPLE 4

A series of films was prepared according to the procedures of Example 1 with variations only in the percentage of the 1M $LiPF_6$ solution added to the coating composition and thus retained in the electrolyte film. These variations and the resulting room temperature ionic conductivities of the films are depicted in the graph of FIG. 1 as trace 14 (circles).

EXAMPLE 5

A second series of films was prepared as in Example 4 using a 1M solution of $LiAsF_6$ in the equipart mixture of EC/PC in place of the $LiPF_6$ solution. The variations in amounts of added salt solution and the resulting room temperature ionic conductivities of the films are depicted in the graph of FIG. 1 as trace 16 (triangles).

EXAMPLE 6

Figure 2:
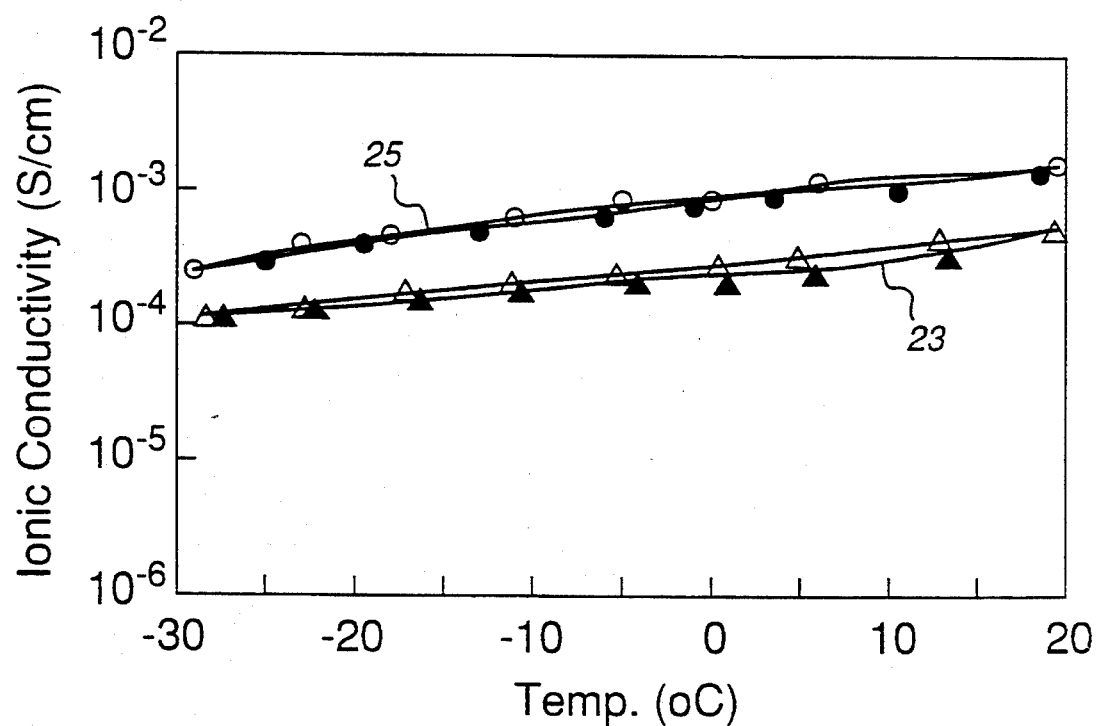
FIG. 2 is a graph tracing the ionic conductivity below room temperature of embodiments of the present polymeric separator membrane varying in the amount of retained salt solution.

A film was prepared according to the procedures of Example 1 with the exception that 1.2 g of the 1M $LiPF_6$ solution was added to the coating composition in order that the resulting film contained about 40% salt solution or about 5.1% $LiPF_6$. Conductivity measurements were then made while cycling the temperature of the film from about room temperature to −30° C. and return. The conductivities of the film are shown in FIG. 2 as trace 23 in which the cooling phase data points are indicated by open triangles and the warming phase points are indicated by filled triangles. As can be observed, the film substantially retained its homogeneity and resultant conductive efficacy over the entire range.

EXAMPLE 7

A film was prepared according to the procedures of Example 6 with the exception that 1.9 g of the 1M $LiPF_6$ solution was added to the coating composition in order that the resulting film contained about 63% salt solution or about 8.1% $LiPF_6$. Conductivity measurements were then made while cycling the temperature of the film from about room temperature to −30° C. and return. The conductivities of the film are shown in FIG. 2 as trace 25 in which the cooling phase data points are indicated by open circles and the warming phase points are indicated by filled circles. As can be observed, the film substantially retained its homogeneity and resultant conductive efficacy over the entire range.

EXAMPLE 8

A 0.1 mm thick electrolyte/separator film was prepared in the manner described in Example 2 from a coating composition of 1.5 g of an 88:12 VdF:HFP copolymer of about $380 \times 10^3$ MW (Atochem Kynar FLEX 2801) in 9 g of anhydrous THF and 1.7 g of a 2M solution of $LiPF_6$ in a 1:1 mixture by weight of EC/PC. A portion of the film was used as the separator element in place of an electrolyte solution-saturated glass paper to construct a "rocking chair" Li-ion battery such as is generally described in U.S. Pat. No. 5,196,279. For use as the positive electrode of the cell, a suspension of 5.6 parts by weight of the VdF-HFP copolymer of Example 1, 11.1 parts of powdered $LiMn_2O_4$, 1.4 parts of SS carbon black, 9.7 parts of 1:1 EC/PC, and 72.2 parts of THF was warmed for about 10 min at 60° C. to facilitate dissolution of the polymer and was then stirred at ambient room temperature to obtain a smooth paste. This paste was coated on an aluminum foil by means of a common doctor blade gapped at about 1.3 mm and air-dried to complete the electrode stock.

Figure 3:
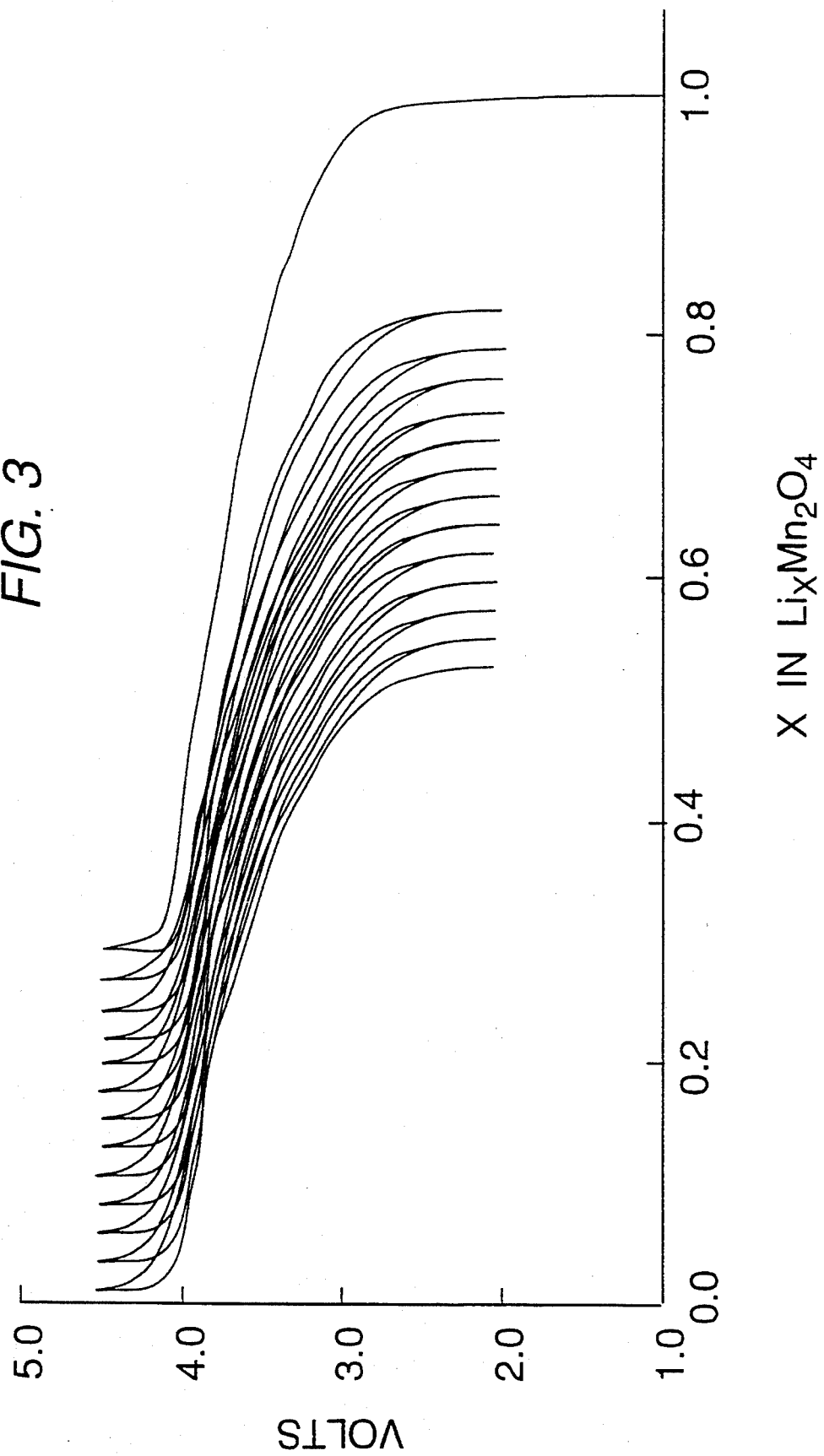
FIG. 3 is a graph tracing the recycling voltage as a function of intercalated lithium for a lithium-ion battery cell comprising a polymeric separator membrane electrolyte of the present invention.

A matching negative electrode was prepared by similarly coating on a copper foil and air-drying a 0.6 mm layer of a paste of 5.6 parts of the VdF-HFP copolymer, 11.8 parts powdered petroleum coke, 0.7 parts SS carbon black, 9.7 parts of the 1:1 EC/PC mixture, and 72.2 parts THF. The difference in the amounts of coated electrode materials was for the purpose of optimizing the ratio of active intercalation materials. The electrode and electrolyte membrane materials were assembled in the usual manner in a Swagelok test cell which was run repeatedly through charge/discharge cycles. The cycling characteristics depicted in FIG. 3 attest to the efficacy of the polymeric electrolyte membrane.

As a means for avoiding problems associated with electrolyte solutions, e.g., the moisture sensitivity of lithium electrolyte salts, the salts may be eliminated from the separator compositions in order that all the cell components may be more conveniently coated and stored at relatively dry conditions. A resulting separator membrane may thus be simply stored or assembled with cell electrode members in a less stringent environment, and at later time a measure of electrolyte salt solution may be added to the assemblage to activate the cell. The following examples demonstrate the variants available for utilizing the present polymeric electrolyte/separator membrane film materials.

EXAMPLE 9

A coating composition was prepared by suspending 1.5 g of an 85:15 VdF:HFP copolymer of about $260 \times 10^3$ MW (Atochem Kynar FLEX 2750) in 10 g of acetone and 1.5 g of propylene carbonate (PC). The mixture was warmed to about 50° C. to facilitate dissolution and with occasional agitation a solution was obtained which retained its fluidity upon standing at room temperature for a number of hours. The solution was cast upon a glass plate with a doctor-blade device at about 1.5 mm and allowed to dry in air at room temperature for about 15 min. The resulting dry, clear, tough, flexible film was readily removed from the glass substrate and was divided into test samples. A first series of samples were completely extracted with diethyl ether to remove the homogeneously dispersed PC plasticizer solvent which was then calculated to be present in the original samples at a level of about 47.7% by weight. This film with retained high-boiling plasticizer solvent (PC) represents the "wet" form of the separator membrane material of the invention which may be stored for later convenient assembly with cell electrode elements. The test sample films from which the PC had been extracted represents the "dry" form of the membrane material.

EXAMPLE 10

A control film material was prepared as in Example 9 with the exception that the PC plasticizer solvent was not added. The resulting film was clear, tough, and flexible, although, understandably, not as extensible as the plasticized sample. Samples of the "wet", "dry", and control films were immersed for a few minutes in a typical rechargeable lithium battery electrolyte solution, viz., a 1M solution of $LiPF_6$ in a 1:1 mixture of ethylene carbonate and propylene carbonate (EC/PC). The samples were then wiped to remove any surface accumulation of electrolyte solution, weighed, and extracted with PC and diethyl ether, in turn, to remove imbibed electrolyte solution. The control sample absorbed about 27% electrolyte solution, while the preswollen "wet" sample took up about 47%, a nearly complete substitution for the original amount of the PC plasticizer in the membrane before immersion in electrolyte. The remaining sample, that from which the original PC plasticizer had been extracted, absorbed about 37% electrolyte solution, nearly 40% more than the control sample. This increase in absorption capacity is indicative of the swelling "memory" imparted to the film by the initial plasticizer solvent content. The ionic conductivity of the membrane samples swollen by immersion closely approximated the values of trace 16 in FIG. 1.

EXAMPLE 11

Test samples were prepared in the manner of Example 10 with substitution of dibutyl phthalate (DBP) for the PC plasticizer solvent. The absorption of electrolyte by the "wet" and "dry" samples during immersion increased significantly over the PC samples, amounting to about 65% and 45%, respectively. Ionic conductivity of the samples increased accordingly, again generally following the values of FIG. 1.

EXAMPLE 12

Test samples according Examples 9–11 were prepared with tetrahydrofuran (THF) instead of acetone. The results of electrolyte absorption and ionic conductivity tests were substantially similar.

EXAMPLE 13

Test samples according to Examples 9–12 were prepared with the addition of up to about 20% by weight of inorganic fillers, $\alpha\text{-}Al_2O_3$ and fumed silanized $SiO_2$, respectively. These optional additives significantly increased the physical strength of the membrane films, yet had varied effects on the capability of the films to absorb electrolyte. The alumina ($\alpha\text{-}Al_2O_3$) filler at about 20% reduced the absorbancy of the "wet" films to about 40% and 58%, respectively, while the "dry" film absorbancy was reduced even more notably to about 30% and 32%. Inclusion of 20% of the silanized fumed silica filler, on the other hand, had little effect on the "wet" film absorbancy, yet profoundly improved the "dry" film absorbancy of electrolyte in PC-cast membranes by about 20% and in DBP-cast films by about 30%. Again, the ionic conductivity of the membranes increased with absorbed electrolyte up to about $10^{-3}$ S/cm.

EXAMPLE 14

The effect of the concentration of electrolyte salt on absorption capacity of a number of membrane materials of varying copolymer ratios of HFP was examined. There was little difference in such capacity over the preferred range of about 12% to 15% hexafluoropropylene (HFP); however, the ability of the membranes to absorb electrolyte solutions, particularly in the "dry" film state, decreased at a regular rate from about 40% to 20% as the electrolyte concentration was increased from about 0.5 to 2.0M. Lower molecular weight copolymer of a given monomer ratio exhibited an ability to absorb greater amounts of electrolyte solution of a given concentration.

EXAMPLE 15

A membrane film was prepared generally in the manner of Example 3 by suspending and swelling the 85:15 copolymer in an equal amount by weight of dibutyl phthalate and pressing the mass at about 130° C. into a 0.15 mm sheet. A sample section of the sheet was then extracted with diethyl ether and reswollen in the electrolyte solution of Example 10 to yield a substantially comparable membrane retaining about 40% electrolyte solution and exhibiting an ionic conductivity of about $10^{-4}$ S/cm.

EXAMPLE 16

Figure 4:
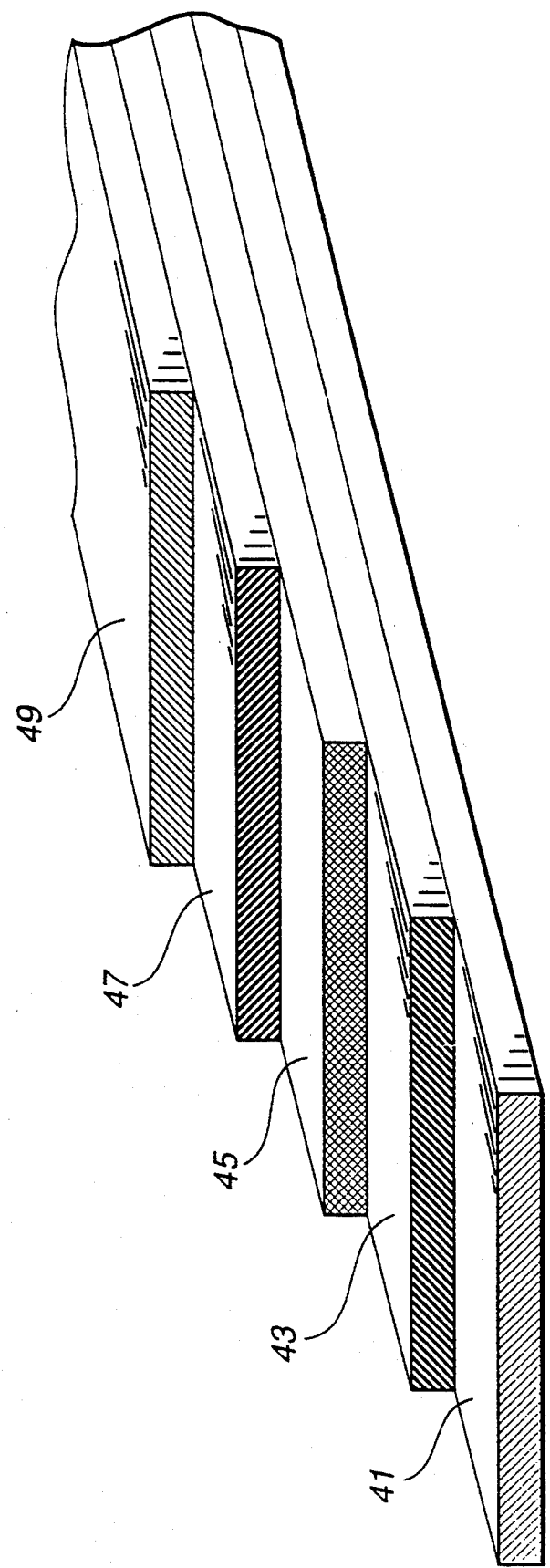
FIG. 4 is a diagrammatic representation of a composite Li-ion battery cell utilizing a polymeric separator membrane electrolyte of the present invention.
Figure 5:
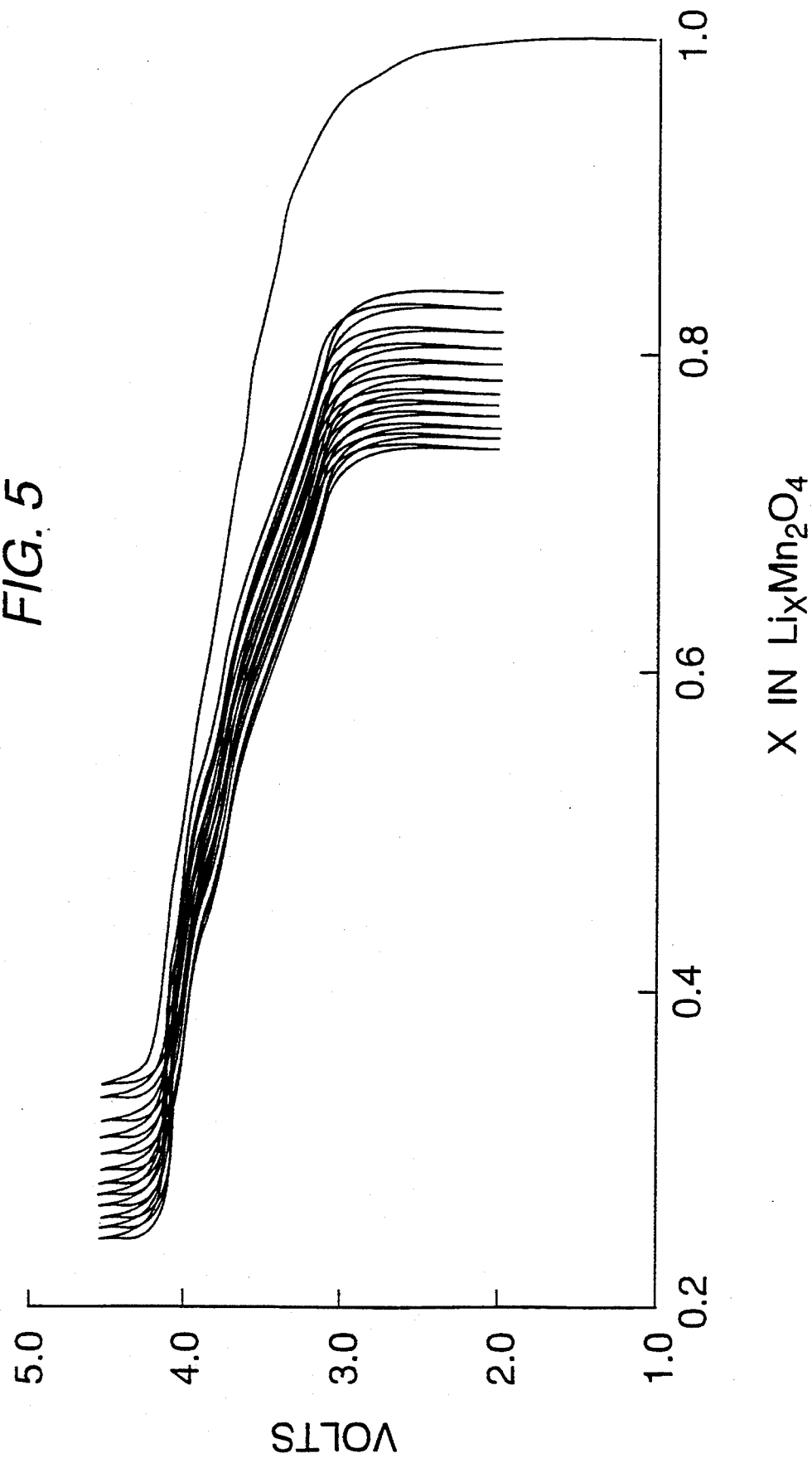
FIG. 5 is a graph tracing the recycling voltage as a function of intercalated lithium for a composite Li-ion battery cell of FIG. 4.

An unextracted portion of the membrane film prepared according to Example 15 was assembled as a separator with the electrode sheet materials of the compositions in Example 8 to form a lithium ion battery cell structure, such as diagrammatically depicted in FIG. 4. As shown, the battery cell comprised, first, an aluminum collector grid 41 coated with the $LiMn_2O_4$ positive electrode composition layer 43 of Example 8. The membrane separator 45 was then overlaid, and, finally, this separator was overlaid with a negative electrode composition layer 47 of Example 8 which was coated on copper collector grid 49. This assembly was then pressed between metal plates at about 130° C. for about one hour to ensure intimate layer contact and thereafter immersed in the electrolyte solution of Example 1 for about 1 hour. The battery cell was then subjected to typical charge/discharge cycle testing with resulting cycling characteristics as shown in FIG. 5.

The polymeric separator membrane materials of the present invention may be successfully activated with any of the numerous compositions used as liquid electrolyte solutions. Notably, there may be employed, both in the membrane preparation and in the electrolyte, other high-boiling organic solvents, such as dimethyl carbonate, diethoxyethane, diethyl carbonate, dimethoxyethane, and dipropyl carbonate. Also, in the formulation of rechargeable lithium battery cells, other useful lithium salts, including $LiClO_4$, $LiN(CF_3SO_2)_2$, $LiBF_4$, $LiCF_3SO_3$, and $LiSbF_6$, may be employed in solution concentrations of between about 0.5 and 2M. Of particular utility are the exceptional ethylene carbonate/dimethyl carbonate compositions of $LiPF_6$ and mixtures with $LiBF_4$ described in U.S. Pat. No. 5,192,629. While the above examples have related in large measure the preparation of a number of battery assemblies, other electrolytic cells, such as electrochromic sheets or panel structures, may make advantageous use of the separator membrane materials of this invention. These and other variants are likewise to be included within the scope of the invention as set out in the appended claims.

What is claimed is:

1. A separator membrane useful for preparing an electrolytic cell characterized in that said membrane is substantially devoid of pores and electrolytic salt and comprises a composition initially comprising a polymeric material and 20 to 70% by weight of a compatible plasticizer therefor and from which composition at least a portion of said plasticizer has been removed, said membrane thereby being in a preconditioned state conducive to absorption of electrolytic solution.

2. A separator membrane according to claim 1 characterized in that said polymeric material comprises a copolymer of vinylidene fluoride with 8 to 25% by weight hexafluoropropylene.

3. A separator membrane according to claim 1 characterized in that said plasticizer is selected from the group consisting of ethylene carbonate, propylene carbonate, dimethyl carbonate, diethoxyethane, dibutyl phthalate, diethyl carbonate, dimethoxyethane, dipropyl carbonate, and mixtures thereof.

4. A separator membrane according to claim 1 characterized in that said copolymer contains 12 to 20% by weight hexafluoropropylene.

5. A separator membrane according to claim 4 characterized in that said copolymer contains 12 to 15% by weight hexafluoropropylene.

6. A separator membrane according to claim 1 characterized in that said plasticizer has been removed from said composition by extraction with a low-boiling extracting solvent which is substantially a non-solvent for said polymeric material.

7. A separator membrane according to claim 1 characterized in that said composition comprises up to about 20% by weight of an inorganic filler selected from the group consisting of alumina and silica.

8. A rechargeable battery cell assembly comprising a positive electrode, a negative electrode, and a separator membrane disposed therebetween characterized in that said membrane is substantially devoid of pores and electrolytic salt and comprises a composition initially comprising a polymeric material and 20 to 70% by weight of a compatible plasticizer therefor and from which composition at least a portion of said plasticizer has been removed, said membrane thereby being in a preconditioned state conducive to absorption of electrolytic solution.

9. A rechargeable battery cell assembly according to claim 8 characterized in that said polymeric material comprises a copolymer of vinylidene fluoride with 8 to 25% by weight hexafluoropropylene.

10. A rechargeable battery cell assembly according to claim 8 characterized in that said plasticizer has been removed from said composition by extraction with a low-boiling extracting solvent which is substantially a non-solvent for said polymeric material.

11. A rechargeable battery cell assembly according to claim 8 characterized in that said composition comprises up to about 20% by weight of an inorganic filler selected from the group consisting of alumina and silica.

* * * * *

UNITED STATES PATENT AND TRADEMARK OFFICE
CERTIFICATE OF CORRECTION

PATENT NO. : 5,418,091

DATED : 23 May 1995

INVENTOR(S): Antoni S. Gozdz et al.

It is certified that error appears in the above-identified patent and that said Letters Patent is hereby corrected as shown below:

Column 11,

In claim 3, line 1, change "claim 1" to read --claim 2--.

In claim 4, line 1, change "claim 1" to read --claim 2--.

Signed and Sealed this

Eighth Day of August, 1995

Attest:

BRUCE LEHMAN

Attesting Officer

Commissioner of Patents and Trademarks